Patented Jan. 8, 1952

2,581,506

UNITED STATES PATENT OFFICE 2,581,506

TREATMENT OF OXIDIZED HYDROCARBONS

Carl N. Zellner, New Providence, N. J., assignor to Tide Water Associated Oil Company, Bayonne, N. J., a corporation of Delaware No Drawing. Application January 10, 1948, Serial No. 1,671

17 Claims. (Cl. 260—485)

The present invention relates to a method for the treatment of oxidized hydrocarbon mixtures to obtain highly desired and useful oxidized products therefrom. More specifically, the invention relates to the treatment of certain oxidized hydrocarbon mixtures, as are more fully described hereinafter, for preparation and isolation of highly useful esterified products.

In the oxidation of hydrocarbons, and particularly in the liquid phase oxidation of predominantly paraffinic hydrocarbons by reaction thereof with oxygen of a free oxygen-containing gas, complex oxidized hydrocarbon mixtures are obtained that comprise a wide variety of oxidized products, the exact nature of which appears to be primarily dependent upon the particular conditions employed for the oxidation. For instance, by employing certain conditions for effecting the oxidation, oxidized hydrocarbon mixtures may be obtained that have relatively low saponification values, e. g., less than about 400 mgms. KOH per gram and, hence, contain a substantial amount of mono-functional substances, e. g., monobasic acids, with a negligible amount, if any, of crystalline difunctional substances. On the other hand, by varying the conditions under which the oxidation is effected, oxidized hydrocarbon mixtures may be obtained that have relatively high saponification values, e. g., at least about 400 mgms. of KOH per gram. For a suitable method for preparation of such high saponification value oxidation mixtures by liquid phase reaction between hydrocarbon mixtures and oxygen of a free oxygen-containing gas, reference is made to my process, and products thereof, disclosed in U. S. Patent No. 2,486,454, issued November 1, 1949. Such oxidized hydrocarbon mixtures contain, in addition to mono-functional substances, a substantial amount of crystalline difunctional substances, e. g., dibasic acids and substances convertible thereto, the attainment of such relatively high saponification values being effective to convert a substantial amount of the hydrocarbons to polyfunctional, in preference to, monofunctional substances. Generally speaking, oxidized hydrocarbon mixtures prepared by liquid phase oxidation of predominantly paraffinic hydrocarbons by reaction thereof with oxygen of a free oxygen-containing gas are characterized by having an acid value lower than the saponification value. In many instances, the acid to saponification value differential is substantial, as for example, the acid value may often represent about 60% of the saponification value. Such oxidized hydrocarbon mixtures represent a potential source for preparation of valuable and highly useful esterified products. However, in the treatment of such oxidized mixtures for preparation and isolation of esterified products therefrom, I have found that, in most instances, the esterified products obtained contain certain undesired saponifiable compounds that are constituents of the portion of the oxidized hydrocarbon mixture accounting for the difference between the acid and saponification values thereof. Whereas esterified products, obtainable from the aforesaid oxidized mixture and substantially devoid of the aforesaid undesired compounds, are highly useful for many purposes, as for example, for plasticizing certain types of synthetic resins, the presence of the aforesaid undesirable constituents in the esterified compounds deleteriously affect the utility and performance of the desired products for many usages as they generally impart acidic and/or incomparability characteristics to the esterified products. It is highly desirable, therefore, to provide a simple and efficient method for the treatment of certain oxidized hydrocarbon mixtures for preparation and recovery therefrom of esterified compounds that are substantially free of the aforesaid saponifiable compounds present in the portion of the oxidized hydrocarbon mixtures accounting for the difference between the acid and saponification values thereof. Thus, it is a primary object of this invention to provide a simple and efficient method for treatment of oxidized hydrocarbon mixtures to accomplish such desired results.

Generally speaking, the process of this invention comprises subjecting a suitable oxidized hydrocarbon mixture to esterification whereby an esterified mixture is obtained containing saponifiable groups combined with an alcohol, as well as saponifiable groups not in combination with an alcohol and treating the product of the esterification with a suitable alkali under controlled conditions effective to preferentially saponify the compounds containing saponifiable groups that are not in combination with an alcohol without affecting substantial, if any hydrolysis of compounds containing saponifiable groups that are in combination with an alcohol. By practicing the invention in accordance with the disclosure herein, highly effective separation and recovery of the desired esterified products, substantially free of the aforesaid undesired compounds, is readily attained.

In broad aspect, the oxidized hydrocarbon mixtures contemplated for use as starting materials for practicing this invention may be defined as oxidized hydrocarbon mixtures that (a) are prepared by liquid phase oxidation of hydrocarbons by reaction thereof with oxygen of a free oxygen-containing gas and (b) are further characterized by having a difference between the acid and saponification value thereof. In a particularly practical embodiment, the invention is directed to the use of, as starting materials, oxidized hydrocarbon mixtures having the aforesaid characteristics and having a saponification value of more than 400 mgms. of KOH per gram as for example, 500 to 625 and even higher, and, hence, contain a substantial amount of crystalline dibasic acids and polyfunctional substances convertible thereto and which oxidized hydrocarbon mixtures are prepared by the process of aforesaid Patent No. 2,486,454. Specific illustrations thereof are oxidized hydrocarbon mixtures disclosed in the examples set forth hereinafter. As aforesaid, in the treatment of such oxidized hydrocarbon mixtures for preparation and isolation of esterified products, the esterified products obtained are often found to contain certain undesired saponifiable compounds that are constituents of the portion of the oxidized hydrocarbon mixture accounting for the difference between the acid and saponification values thereof. For example, by subjecting such oxidized hydrocarbon mixtures to esterification with an excess of a suitable alcohol under certain conventional esterification conditions, and treating the esterified mixture for recovery of desired esterified products, as for example, by distillation, the distillate fractions are found to have an acid value higher than the acid value of the esterified mixture charged to the distillation. Such results are obtained when all of the saponifiable groups in the oxidized hydrocarbon mixture are not in combination with an alcohol after subjecting such a mixture to esterification, and hence, the esterified mixture contains both saponifiable groups that are in combination with an alcohol and saponifiable groups that are not in combination with an alcohol. Further, it has been found that use of certain conventional methods for removal of acidic substances, such as by washing of the aforesaid distillates with water, aqueous sodium bicarbonate, and the like, is not wholly effective to provide esterified products that are substantially free of the compounds imparting such acidic values thereto. However, by practicing the invention as disclosed herein, and subjecting such esterified mixtures to treatment with a suitable alkali under controlled conditions, as is more fully described hereinafter, the desired esterified products are obtainable in a form substantially free of the aforesaid undesirable constituents.

With further reference to the oxidized hydrocarbon mixtures suitable for use as starting materials for practicing this invention, I have found that, upon subjecting such mixtures to esterification with an excess of a suitable alcohol, using certain conventional esterification methods, the amount of alcohol that reacts is often considerably less than the theoretical required for reaction with all of the saponifiable groups in the mixtures. In many instances, the amount of alcohol that reacts is found to be substantially equivalent to the free acid value of the mixture, which, as aforesaid, may generally represent only about 60% of the total saponifiable groups. Although the oxidized hydrocarbon mixtures, prior to subjection thereof to esterification with an excess of a suitable alcohol, may contain, as components of the portion accounting for the difference between acid and saponification value thereof, compounds whose saponifiable groups are already combined with an alcohol, and hence, such compounds do not react with the alcohol used in the aforesaid esterification, in most instances, the portion of the oxidized hydrocarbon mixture that accounts for the difference between the acid and saponification value is comprised predominately, or wholly, of compounds having saponifiable groups that are not combined with an alcohol, and are not combined with an alcohol when subjected to certain conventional esterification conditions even when an excess of alcohol is employed. That such compounds are present is evidenced by the fact that by completely hydrolyzing the esterified mixture, alcohol liberation from such compounds does not occur. As aforesaid, the primary object of this invention is to isolate, from esterified oxidized hydrocarbon mixtures, having the aforesaid characteristics, compounds having saponifiable groups combined with an alcohol that are substantially free of compounds containing saponifiable groups that are not combined with an alcohol prior to subjection of the oxidized hydrocarbon mixture to esterification with an alcohol and which groups are not combined with an alcohol as a result of having subjected the oxidized hydrocarbon mixture to esterification.

In accordance with this invention, esterified mixtures as aforesaid that contain saponifiable groups combined with an alcohol and saponifiable groups not in combination with an alcohol, are treated with a suitable alkali under controlled conditions to selectively saponify constituents of the esterified mixture that contain saponifiable groups not combined with an alcohol without the occurrence of substantial, if any, hydrolysis of the desired esterified products, i. e., products whose saponifiable groups are in combination with an alcohol. In broad aspect, the aforesaid selective treatment comprises adding to the esterified mixture a suitable alkali in an amount at least equivalent to the number of saponifiable groups present therein that are not in combination with an alcohol. In order that selective isolation of the desired esterified products may be effected, it is important that the alkali addition be made in a controlled manner so that, during addition of the alkali and until an amount has been added equivalent to the number of saponifiable groups not in combination with an alcohol, liberation of alcohol does not occur, if at all, in other than a negligible amount, as liberation of alcohol before the aforesaid amount of alkali addition has been completed evidences that undesired hydrolysis of the desired esterified product is being effected simultaneously with saponification of the undesired constituents. Occurrence of such hydrolysis is undesirable in that it results in decreased yields of the desired products. By controlled addition of alkali as aforesaid, an alkali treated esterified mixture is obtained from which the desired esterified products are recoverable substantially free of the compounds containing saponifiable groups that were not combined with an alcohol. An important feature of this invention resides in the discovery that by the controlled alkali treatment of the esterified mixtures, selective separation is effected between the desired esterified products and compounds having saponifiable groups that are not combined with an alcohol. As aforesaid, in practicing the invention, the alkali addition is made in a controlled manner so that, until an amount of alkali is added equivalent to the number of saponifiable groups in the esterified mixture that are not combined with an alcohol, the concentration of alkali present in the mixture is maintained at below the amount effective to liberate any substantial, if any, amount of alcohol, the occurrence of which evidences that desired esterified products are undergoing hydrolysis. Although the invention is not to be considered limited to any particular method for controlling the addition of the alkali to the esterified mixture so as to provide the results embodied herein, for purposes of illustration, several methods that may suitably be employed are described hereinafter. For instance, one method that may be suitably employed is to gradually add the alkali, either continuously or intermittently, to the esterified mixture until an amount of alkali has been added equivalent to the number of saponifiable groups in the mixture that were not combined with an alcohol, the amount of alkali being controlled so that during addition thereof, substantially no alcohol liberation occurs. Preferably during the alkali addition, the esterification mixture is agitated, as for example, by stirring or by refluxing to decrease the possibility of building up local concentrations of the alkali in the mixture which may result in simultaneous saponification of the undesired compounds along with hydrolysis of the desired esterified products. Another method that may be employed comprises the use of a suitable indicator, as for example, thymolphthalein, in the esterified mixture, and gradually adding the alkali to the esterified mixture while observing the time required for disappearance of indicator color. The alkali addition is continued in this manner until the time required for disappearance of indicator color increases materially, the rate and/or amount of the alkali addition being controlled so as to prevent liberation of alcohol prior to the time required for disappearance of indicator color to increase materially. When practiced in this manner, the persistence of indicator color evidences that substantially complete saponification of the undesired compounds has been effected without the occurrence of any substantial, if any, hydrolysis of the desired esterified products. When the time required for disappearance of indicator color has materially increased, the alkali addition is discontinued, as otherwise, hydrolysis of the desired esterified products would begin to occur, resulting in decreased yield thereof. In some instances, it may be desired to sacrifice yields of the desired products in favor of insuring that the undesired substances are fully saponified, and, hence, for such a purpose, the alkali may be added in an amount slightly in excess of that required to reach the indicator end point, i. e., slightly in excess of the theoretical equivalents for the number of saponifiable groups in the esterified mixture that were not in combination with an alcohol. Although the aforesaid methods represent highly practical embodiments for practicing the invention, it is within the scope of the present invention to embody other methods for determining the desired rate of alkali addition as long as the addition is made in a controlled manner effective to selectively saponify the aforesaid undesired groups without substantial, if any, liberation of alcohol in the esterified mixture until an amount of alkali is added at least equivalent to the number of saponifiable groups in the mixture that were not in combination with an alcohol.

While the present invention, as is more fully described hereinafter, is described by use of the hydroxides of sodium and potassium for the selective treatment of the aforesaid esterified oxidized hydrocarbon mixtures, such alkalies have been employed for purposes of illustration without intending that the scope of this invention be limited thereto. In preferred embodiment, however, the alkalies employed comprise the hydroxides of the alkaline earth and alkali metals, suitable examples of which include the hydroxides of sodium, potassium, calcium and the like. The alkalies are preferably employed in aqueous solutions, or in solution with a solvent that is substantially immiscible with esters, and more specifically, is not miscible with the desired esterified products obtained by subjecting esterified oxidized hydrocarbon mixtures as aforesaid to the selective alkali treatment of this invention. Illustrations of such solutions include aqueous solutions of the alkali and alkaline earth metals, solutions thereof in certain alcohols, as for example, glycol, and the like.

The following examples are set forth to illustrate specific embodiments of the invention without intending that the invention be limited thereto:

EXAMPLE I

An oxidized hydrocarbon mixture was prepared by subjecting paraffin wax to liquid phase reaction with air until the mixture had an acid value of 329 and a saponification value of 560 mgms. of KOH per gram. The mixture was subjected to esterification using butyl alcohol in an amount 10% in excess of the theoretical amount required to react with the saponifiable groups in the mixture. The esterification was carried out by refluxing for 20 hours at 135° C. in the presence of naphthalene sulfonic acid as a catalyst. Upon completion of esterification, evidenced by cessation of water evolution, the amount of water evolved was found to be substantially equal to the theoretical on the basis of the acid value of the oxidized hydrocarbon mixture. The esterified mixture had an acid value of less than 0.2 milliequivalent per gram.

The aforesaid esterified mixture was vacuum distilled under conditions set forth in the following tabulation, the distillate being collected in fractions as shown:

*Table I*

| Cut No. | Percent by Weight of Cut based on Oxidized Hydrocarbon Mixture | Distillation Range, °C. | Pressure, mm. Hg | Acid value of cut, meqs./gm.[1] | Saponification Value of Cut, meqs./gm. | Equivalent Weight of Cut | Molecular Weight of Cut |
|---|---|---|---|---|---|---|---|
| 1 | 5 | 50–110 | 6 | 0.2 | 6.8 | 147 | 165 |
| 2 | 8 | 110–130 | 5 | 0.2 | 7.5 | 133 | 191 |
| 3 | 14 | 140–143 | 5 | 0.2 | 7.9 | 126 | |
| 4 | 13 | 143–157 | 4 | 0.3 | 7.7 | 130 | [2] 280 |
| 5 | 8 | 157–170 | 4 | 0.4 | 7.5 | 133 | 24 |
| 6 | 11 | 170–180 | 3 | 0.8 | 7.4 | 135 | |
| 7, 8, 9 | 41 | 180–244 | 2 | 1.9 | 7.6 | 132 | |
| 10 | 13 | 244–260 | 5 | 2.4 | 7.4 | 135 | [3] 268 |
| | [4] 113 | | | | | | |
| | [5] 13 | | | | | | |
| | [6] 126 | | | | | | |

[1] Meqs./gm.=milliequivalents/gram (ml. of NKOH per gram).
[2] After extraction of compounds (26%) containing saponifiable groups not in combination with an alcohol, by the alkali treatment of this invention.
[3] After extraction of water-soluble material (7% of cut).
[4] Total overhead.
[5] Residue.
[6] Total recovery.

The foregoing data shows that by subjecting the esterified mixture to fractional distillation, such as conventionally employed for isolation of esterified products, each of the distillate fractions had an acid value higher than the esterified mixture charged to the distillation. As shown, whereas the charge material had an acid value lower than 0.2 meqs./g., the lower fractions (cuts 1–3), consisting predominantly of monofunctional substances, had an acid value of 0.2 and the higher fractions (cuts 4–10), consisting predominantly of difunctional substances, had acid values ranging from 0.3–2.4. It is clear, therefore, that not only is distillation ineffective to provide esterified products substantially free of undesired compounds, i. e., the compounds imparting acidic values, but is further undesirable in that it resulted in conversion of substantially acidic-free compounds in the esterified mixture to compounds having free acid groups.

Cut No. 10 having a distillation range of 244 to 260° C., acid value of 2.4 meqs./gm. and saponification of 7.4 meqs./gm. was washed with water and then with aqueous sodium bicarbonate in accordance with conventional procedures for removal of water-soluble and acidic substances but the raffinate was found to contain compounds having saponifiable groups that were not combined with an alcohol. In accordance with this invention, the raffinate was refluxed with aqueous acetone while aqueous KOH was added gradually, i. e., dropwise, to the raffinate in the presence of thymolphthalein, until a pronounced increase occurred in the time required for disappearance of indicator color up to which time no ascertainable liberation of alcohol occurred. The alkali addition was continued until, after addition of each drop of indicator color, the time of color persistence increased from rapid disappearance to about 10 minutes. When the time required for disappearance of indicator color had thus increased materially, the alkali addition was discontinued. The alkali-treated mixture had separated into two layers: the top layer was removed and, upon analysis, gave the following values evidencing that by use of the aforedescribed controlled alkali addition treatment, effective isolation of substantially pure dibutyl esters of diacids averaging about 15 carbon atoms had been obtained:

*Table II*

|  | Purified Cut 10 Experimental values | Dibutyl Pentadecanedioate Theoretical values |
|---|---|---|
| Ester Value (meqs./gm.) | 5.3 | 5.2 |
| Equivalent Weight | 189 | 191 |
| Molecular Weight | about 400 (camphor freezing point). | 382 |

The bottom layer was distilled to remove water, and upon heating of the dried product with an excess of alkali, butyl alcohol liberation did not occur, thus evidencing that the aforesaid selective alkali treatment of the distillates (cut 10) had removed compounds whose saponifiable groups were not combined with an alcohol.

EXAMPLE II

Cut No. 4 (see Table I in Example I) having an acid value of 0.3 meq./gm. and a saponification value of 7.7 meqs./gm. was treated by addition thereto of aqueous KOH while refluxing the cut with an equal volume of water. The alkali was added dropwise, in the presence of thymolphthalein until a sudden increase (from about 30 seconds to about 10 minutes) occurred in the time required for disappearance of indicator color after each increment of the alkali addition. Total alkali addition was substantially equivalent to one third of the saponifiable value of the cut, and during addition thereof, no substantial, if any, alcohol liberation had occurred. Upon completion of the alkali addition, the alkali treated material had formed two layers, the top layer (70% of the cut) was removed and distilled to yield a butyl ester of 140 equivalent weight and about 280 molecular weight, i. e., a dibutyl ester of a $C_8$ di-acid, $C_4H_9OOC-C_6H_{12}-COOC_4H_9$, having an acid value of 0.13 meq./gm. and a saponification of 7.1 meqs./gm.

EXAMPLE III

An oxidized hydrocarbon mixture (1420 g.), prepared by air blowing of 120° F. melting point paraffin wax at 120° C. in the presence of ½% of manganese naphthenate, and having an acid value of 6.2 meqs./gm. and a saponification value of 10.3 meqs./gm. was subjected to esterification by refluxing with an excess of butanol at 113°–122° C. The esterification was carried on for 30 hours. Excess butanol was distilled off, and the residual reaction mixture analyzed to a saponification value of 7.3.

A portion (20 g.) of the residual reaction mixture was analyzed for butyl content by adding an excess of KOH, and distilling the thus treated substance to remove butanol liberated by saponification with KOH. The amount of butanol recovered was 6.3 grams. Theoretically, if all of the saponifiable groups of the residual mixture were combined with butanol, the amount of butanol liberated by the alkali would be 10.8 grams. However, the liberation of only 58% of the theoretical amount of butanol evidences that of the total saponifiable groups in the residual mixture, only about 58% thereof were combined with butanol.

The main batch of the oxidized hydrocarbon mixture that was treated with butanol under the aforesaid esterification procedure was flash distilled at 350° C. and 2.2 mm. pressure and yielded 97% overhead, 2% bottoms, and 1% of cracked esters condensed in an ice-trap. The purpose of the flash distillation was to remove a small amount of polymeric materials as bottoms to decrease the possibility of undesirable emulsification during the alkali treatment and layer separation as described hereinafter.

Upon analysis, the flash distillate was found to have a butyl content of 62.5% based on saponification value thereof. In accordance with this invention, the distillate was treated by adding thereto an amount of aqueous KOH equivalent to 37.5% of the saponifiable groups in the distillate. The required amount of alkali, dissolved in four times its weight of water, was added in small portions over a period of one hour while constantly stirring the distillate at 95° C. Before each addition of alkali, the time required for disappearance of indicator color was observed. The addition was continued until the aforesaid amount of total alkali had been added. During the alkali addition there was no evidence of alcohol liberation up to which time the time required for persistance of indicator color was not materially increased. The alkali-treated distillate had formed into two layers; a top layer comprising about 53% of the aforesaid distillate and a bottom layer containing the alkali salts of compounds in the esterified mixture that contained saponifiable groups not in combination with an alcohol. The top layer was vacuum distilled to provide an overhead fraction (63% of charge to distillation) having a boiling point of 65–198° C. at 0.6 mm. pressure and a liquid bottoms product (37% of the charge). The overhead fraction was analyzed for butyl content by heating thereof with an excess of diethylene glycol at 200° C. with a trace of sodium as exchange catalyst until no more butanol distilled off through a Widmer column and an amount of butanol was recovered equal to 96% of the theoretical value based on the saponifiable groups in the aforesaid overhead fraction. The aforesaid liquid bottoms was treated in a similar manner, and the amount of butanol recovered equalled 93% of the theoretical value based on the saponification value of the bottoms product. In view of such high butanol recoveries from both fractions of the top layer, obtained from the aforesaid controlled alkali treatment of the esterified oxidized hydrocarbon mixture, it is evident that the top layer was substantially all comprised of butyl esters that were substantially free of compounds in the esterified mixture containing saponifiable groups that were not combined with an alcohol.

The bottom layer, obtained from the controlled alkali treatment of the aforesaid esterified mixture, was concentrated by evaporation, and concentrated HCl added thereto in an amount equivalent to the amount of alkali used in the aforesaid controlled alkali treatment, i. e., 37.5% of the total saponifiable groups in the esterified mixture. The material liberated by the HCl was extracted with methyl ethyl ketone, distilled to recover methyl ethyl ketone, and refluxed with an excess of 2-ethyl hexanol until water evolution ceased. The crude esterified product obtained was vacuum distilled, and the distillate treated at 95° C., while being agitated by stirring, by gradually adding thereto aqueous KOH until the time required for indicator color disappearance increased materially. The total amount of alkali added was equivalent to 24% of the saponifiable equivalents. The alkali treated material separated into two layers. The top layer was distilled; a small forerun representing less than 5% of the total 2-ethyl hexanol equivalents was obtained showing that only minute quantities of the desired esterified products were hydrolyzed. The main cut of distilled 2-ethyl hexyl esters had an acid value of 0.06 and a saponification value of 5.0 meqs./gm., and, upon saponification with alkali, liberated 90% of the theoretical 2-ethyl hexanol.

EXAMPLE IV

In a manner similar to that set forth in Example III, a crude esterified mixture was prepared by subjecting the oxidized hydrocarbon mixture to esterification with an excess of butanol. The esterified mixture was vacuum distilled providing an overhead which was washed with aqueous sodium carbonate, separated, and topped to remove water. The topped product was heated with an excess of 2-ethyl hexanol at 200–210° C. in the presence of 0.2% of sodium as exchange catalyst. After seven hours, substantially all of the recoverable butanol had distilled off as overhead. The amount of butanol thus obtained was equal to 54% of the theoretical equivalents based on the saponification value of the aforesaid esterified mixture.

In accordance with this invention, the aforesaid exchange reaction mixture while refluxing at 95° C. was treated by gradual addition thereto of aqueous KOH in the presence of thymolphthalein as an indicator. The alkali was added over a period of 2½ hours in twenty portions, the addition being discontinued when the time of disappearance of indicator color increased from about 2 to 14 minutes. During the alkali addition, there was no ascertainable liberation of alcohol. The alkali treated mixture had formed into 2 layers. The top layer was separated, and distilled to provide a forerun of less than 3% by weight (about 4% of the total possible) of 2-ethylhexanol, illustrating that relatively negligible attack had occurred of esterified products whose saponifiable groups were combined with an alcohol. The distilled esterified product analyzed to give a saponification value of 5.3 meqs./g. and a negligible acid value of 0.05, showing that upon distillation of esters purified by the alkali treatment of this invention no decomposition to free acids occurred whereas, if the esterified oxidized hydrocarbon mixture is subjected to distillation before and without use of the aforesaid alkali treatment, the distillate obtained therefrom has an acid value greater than the esterified oxidized hydrocarbon mixture charged to the distillation.

EXAMPLE V

One kilogram of an oxidized hydrocarbon mixture, prepared by liquid phase oxidation of scale wax with air, having an acid value of 5.8 and saponification value of 10 meqs./g. was subjected to esterification in an autoclave with 400 grams of methanol, by gradually heating to 173° C. with shaking at a pressure of 500 lbs./sq. inch. Excess methanol and water of reaction were distilled off and the residual product treated with dry methanol under the aforesaid conditions. The product obtained was topped to remove excess methanol and water and subjected to continuous flash distillation at 350° C. and 9 mm. pressure. Polymeric bottoms amounted to 8%. The overhead was treated at 30° C. with stirring by gradual addition of aqueous sodium hydroxide over a 2 hour period, until an amount of alkali equivalent to 10% of the total saponification equivalents had been added. The alkali treated mixture separated into two layers. The top layer was removed, and vacuum distilled wherefrom a methyl ester raffinate fraction boiling from 60°–187° C. at 8 mm. pressure was obtained having an acid value of 0.08 meq./g., a saponification value 8.3 meqs./g. and a molecular weight of 199.

Oxidized hydrocarbon mixtures, such as disclosed herein as suitable starting materials for practicing this invention, are complex mixtures of oxidized compounds, the exact structure of which are not known and are not readily determinable. For example, various theories have been proposed by the prior art as to the possible structure of the compounds accounting for the difference between the acid and saponification values of the oxidized hydrocarbon mixtures. Among these, esters, estolides, lactones, lactone acids, lactides and other esters of alpha-hydroxy acids have been most often mentioned. From such teachings, it was not foreseeable that the process of the present invention would perform the function as disclosed, but on the contrary, it would be expected that quite the reverse would take place. For example, in the investigational work leading up to the discovery of the present invention esters of alpha hydroxy acids were prepared for comparison studies, and it was found that such esters hydrolyzed with ease under the controlled alkali treatment of this invention as described herein. Lactides and esters of oxalic and malonic acids, which have been postulated as being present in oxidized hydrocarbon mixtures, performed similarly to the esters of alpha hydroxy acids. Hence, if these types of easily hydrolyzable esters were present in any appreciable quantities, they would give rise to equivalent quantities of alcohol, e. g., butanol, during the alkali treatment of this invention. That such compounds are apparently not present in any appreciable quantities, if any, appears evidenced by the illustrations of this invention, as set forth hereinbefore, showing the lack of substantial, if any, alcohol liberation during the controlled alkali treatment. Moreover, if "lactone acids" were present, such compounds would be expected to esterify yielding lactone esters which would hydrolyze yielding alkali soaps upon controlled saponification in accordance with the method of this invention, and such half-esters would yield an alcohol upon boiling with excess alkali. However, investigation has shown that such results are not obtained. Although it is not intended that the present invention be limited by any theories as to the exact structure of compounds present in the portion of such mixtures accounting for the difference between the acid and saponification value thereof, it is apparent from the aforesaid description of the invention that by practice thereof, highly effective preparation and isolation is realized of esterified compounds that are substantially free of compounds having saponifiable groups that are not combined with an alcohol. The obtainment of such highly effective isolation of the desired products by the novel treatment disclosed herein is clearly an unobvious and unexpected result representing a marked improvement in the art.

Although the present invention has been described in conjunction with certain preferred embodiments thereof, those skilled in the art will readily recognize that variation and modifications can be made. Such modifications and variations are to be considered to be within the purview of the specification and scope of the appended claims.

I claim:

1. A method for treatment of an oxidized hydrocarbon mixture as defined hereinafter to prepare and facilitate recoverability of desired esterification products thereof, said oxidized hydrocarbon mixture being characterized by having been prepared by liquid phase reaction of a hydrocarbon mixture with oxygen of a free oxygen-containing gas, having a substantial difference between acid and saponification value, and further characterized by containing, as components of the portion accounting for the difference between acid and saponification value, compounds containing saponifiable groups that are not readily combinable with an alcohol upon treatment of said oxidized hydrocarbon mixture with an alcohol under esterifying conditions, which comprises reacting said oxidized hydrocarbon mixture with an alcohol under esterifying conditions to provide an esterified mixture containing a substantial portion of saponifiable compounds whose saponifiable groups are esterified with the alcohol and compounds possessing saponifiable groups that are not combinable with an alcohol under the esterification conditions, and adding an alkali to the aforesaid esterified mixture in an amount at least substantially equivalent to the number of saponifiable groups in said esterified mixture that are not combined with an alcohol but substantially less than an amount of alkali equivalent to the total number of saponifiable groups in said esterified mixture to selectively saponify the compounds in said esterified mixture that possess saponifiable groups that were not combined with an alcohol, said alkali addition being made in a controlled manner whereby, until an amount of alkali substantially equivalent to the number of saponifiable groups that are not combined with an alcohol has been added, the alkali in the esterified mixture is maintained at a concentration less than sufficient to liberate a substantial amount of alcohol from said esterified mixture.

2. A method, as defined in claim 1, wherein the compounds whose saponifiable groups are in combination with an alcohol are separated from the alkali-treated mixture substantially devoid of admixture with the selectively saponified compounds that possessed saponifiable groups that were not combinable with the alcohol upon treatment of the oxidized hydrocarbon mixture under th esterification conditions.

3. A method, as defined in claim 1, wherein the alkali is in solution with a liquid that is substantially immiscible with the compounds in the esterified mixture whose saponifiable groups are combined with an alcohol.

4. A method, as defined in claim 1, wherein the alkali is in aqueous solution.

5. A method, as defined in claim 4, wherein the compounds whose saponifiable groups are combined with an alcohol are separated from the alkali-treated mixture substantially devoid of admixture with the selectively saponified compounds that possessed saponifiable groups that were not combined with an alcohol upon treatment of the oxidized hydrocarbon mixture under the esterification conditions.

6. A method, as defined in claim 1, wherein the oxidized hydrocarbon mixture has a saponification value of at least 400.

7. A method, as defined in claim 6, wherein the alkali is in aqueous solution.

8. A method, as defined in claim 1, wherein the alkali-treated mixture comprises a layer containing saponifiable compounds whose saponifiable groups are combined with an alcohol substantially devoid of admixture with compounds possessing saponifiable groups that were not combined with the alcohol upon treatment of the oxidized hydrocarbon mixture under esterification conditions and a layer containing the selectively saponified compounds having saponifiable groups that were not combined with the alcohol upon treatment of the oxidized hydrocarbon mixture under the esterification conditions.

9. A method for treatment of an esterified oxidized hydrocarbon mixture as defined hereinafter to improve the recoverability of desired esterified products thereof, said esterified oxidized hydrocarbon mixture being characterized by containing a substantial amount of saponifiable compounds whose saponifiable groups are combined with an alcohol in admixture with saponifiable compounds that are not readily combinable with an alcohol under esterification conditions, said esterified oxidized hydrocarbon mixture having been prepared by reacting with an alcohol under esterification reaction conditions an oxidized hydrocarbon mixture prepared by liquid phase oxidation of hydrocarbons with oxygen of a free oxygen-containing gas, having a substantial difference between acid and saponification value and containing, as components of the portion accounting for the difference between acid and saponification value, compounds containing saponifiable groups that are not readily combinable with an alcohol upon treatment of said oxidized hydrocarbon mixture under esterification conditions, which comprises selectively saponifying the compounds in said esterified mixture that are not in combination with an alcohol by addition to said esterified oxidized hydrocarbon mixture of an alkali in an amount at least substantially equivalent to the number of saponifiable groups in said esterified mixture that are not in combination with an alcohol but substantially less than an amount of alkali equivalent to the total number of saponifiable groups in said esterified mixture, said alkali addition being made in a controlled manner whereby, until an amount of alkali substantially equivalent to the number of saponifiable groups that are not combined with an alcohol has been added, the alkali in the esterified mixture is maintained at a concentration less than sufficient to liberate a substantial amount of alcohol from said esterified mixture.

10. A method, as defined in claim 9, wherein the alkali is in aqueous solution.

11. A method, as defined in claim 9, wherein the oxidized hydrocarbon mixture has a saponification value of at least 400.

12. A method, as defined in claim 9, wherein the alkali is in aqueous solution, the oxidized hydrocarbon has a saponification value of at least 400, and the alkali-treated esterified oxidized hydrocarbon mixture comprises a layer containing saponifiable compounds whose saponifiable groups are combined with an alcohol substantially devoid of admixture with compounds possessing saponifiable groups that were not combinable with an alcohol upon treatment of the oxidized hydrocarbon mixture under esterification conditions and a layer containing the selectively saponified compounds having saponifiable groups that were not combined with an alcohol upon treatment of the oxidized hydrocarbon mixture under esterification conditions.

13. A method, as defined in claim 9, wherein the layer containing saponifiable compounds whose saponifiable groups are combined with an alcohol is separated from the alkali treated mixture.

14. A method for treatment of an esterified oxidized hydrocarbon mixture as defined hereinafter to improve the recoverability of desired esterified products thereof, said esterified oxidized hydrocarbon mixture being characterized by containing a substantial amount of saponifiable compounds whose saponifiable groups are combined with an alcohol in admixture with saponifiable compounds that are not combined with an alcohol, said esterified oxidized hydrocarbon mixture having been prepared by reacting with an aliphatic alcohol under esterification reaction conditions an oxidized hydrocarbon mixture prepared by liquid phase oxidation of a predominantly aliphatic hydrocarbon mixture with oxygen of a free oxygen containing gas, having a saponification value of at least about 400 and a substantial difference between acid and saponification value, and containing, as components of the portion accounting for the difference between acid and saponification value, compounds containing saponifiable groups that are not readily combinable with an alcohol upon treatment of said oxidized hydrocarbon mixture under esterification conditions, which comprises selectively saponifying the compounds in said esterified mixture that are not in combination with an alcohol by addition to said esterified oxidized hydrocarbon mixture of an aqueous solution of an alkali in an amount at least substantially equivalent to the number of saponifiable groups in said esterified mixture that are not in combination with an alcohol but substantially less than an amount of alkali equivalent to the total number of saponifiable groups in said esterified mixture, said alkali addition being made in a controlled manner whereby, until an amount of alkali substantially equivalent to the number of saponifiable groups that are not combined with an alcohol has been added, the alkali in the esterified mixture is maintained at a concentration less than sufficient to liberate a substantial amount of alcohol from said esterified mixture.

15. A method, as defined in claim 14, wherein the alkali is an aqueous solution of a hydroxide of a metal from the group consisting of alkali metals and alkaline earth metals.

16. A method, as defined in claim 15, wherein the esterifying alcohol is an aliphatic monohydric alcohol.

17. A method for treatment of an esterified oxidized hydrocarbon mixture as defined hereinafter to improve the recoverability of desired esterified products thereof, said esterified oxidized hydrocarbon mixture being characterized by containing a substantial amount of saponifiable compounds whose saponifiable groups are combined with an alcohol in admixture with saponifiable compounds that are not combined with an alcohol, said esterified oxidized hydrocarbon mixture having been prepared by reacting with an aliphatic alcohol under esterification reaction conditions and oxidized hydrocarbon mixture prepared by liquid phase oxidation of a predominantly aliphatic hydrocarbon mixture with oxygen of a free oxygen-containing gas, having a substantial difference between acid and saponification value, and containing, as components of the portion accounting for the difference between acid and saponification value, compounds containing saponifiable groups that are not readily combinable with an alcohol under esterification conditions, which comprises selectively saponifying compounds in said esterified mixture that are not in combination with an alcohol by addition to said esterified oxidized hydrocarbon mixture of an alkali in an amount at least equivalent to a substantial portion of the saponifiable groups in said esterified mixture that are not in combination with an alcohol but substantially less than an amount of alkali equivalent to the total number of saponifiable groups in said esterified mixture, said alkali addition being made in a controlled manner whereby, upon addition of alkali in an amount up to that substantially equivalent to the saponifiable groups not combined with an alcohol, the alkali in the esterified mixture is maintained at a concentration less than sufficient to liberate a substantial amount of alcohol from said esterified mixture.

CARL N. ZELLNER.

REFERENCES CITED

The following references are of record in the file of this patent:

UNITED STATES PATENTS

| Number | Name | Date |
|---|---|---|
| 2,054,979 | Jahrstorfer | Sept. 22, 1936 |
| 2,153,302 | Ewing | Apr. 4, 1939 |